US006907196B2

(12) United States Patent
Richards et al.

(10) Patent No.: US 6,907,196 B2
(45) Date of Patent: Jun. 14, 2005

(54) ARRANGEMENT AND METHOD FOR TESTING FIBER OPTIC TELECOMMUNICATIONS CIRCUITS OVER DENSE WAVELENGTH DIVISION MULTIPLEXING (DWDM)

(75) Inventors: Douglas L. Richards, Stilwell, KS (US); David W. Williams, Oluthe, KS (US); Francis R. Yarkosky, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/874,444

(22) Filed: Jun. 23, 2004

(65) Prior Publication Data

US 2004/0228628 A1 Nov. 18, 2004

Related U.S. Application Data

(63) Continuation of application No. 09/758,496, filed on Jan. 11, 2001, now Pat. No. 6,778,778.

(51) Int. Cl.⁷ ..................... H04B 10/08; H04B 17/00; H04J 14/02
(52) U.S. Cl. ............... 398/14; 398/9; 398/11; 398/16; 398/17; 398/37; 398/58; 398/92; 398/18; 398/157; 398/160; 398/177; 359/341.4; 356/73.1; 379/29.1
(58) Field of Search .................. 398/9–11, 13–14, 398/16–18, 34, 37, 58, 92, 157, 160, 177; 359/341.4; 356/73.1; 370/242, 245; 379/28, 29.01

(56) References Cited

U.S. PATENT DOCUMENTS

| 5,077,729 A | | 12/1991 | Wong |
| 5,367,394 A | | 11/1994 | Chuter et al. |
| 5,416,623 A | | 5/1995 | Dawson et al. |
| 5,754,285 A | * | 5/1998 | Eslambolchi et al. ...... 356/73.1 |
| 5,796,953 A | * | 8/1998 | Zey .............................. 709/227 |
| 5,969,833 A | * | 10/1999 | Jensen ........................... 398/34 |
| 6,233,073 B1 | | 5/2001 | Bowers et al. |
| 6,301,336 B1 | | 10/2001 | Branton, Jr. et al. |
| 6,317,535 B1 | | 11/2001 | Jennings et al. |
| 6,335,810 B1 | | 1/2002 | Uehara |
| 6,671,469 B1 | * | 12/2003 | Fukagawa et al. ............. 399/30 |
| 6,687,049 B1 | * | 2/2004 | Sulhoff et al. ............ 359/341.4 |
| 6,778,778 B1 | * | 8/2004 | Richards et al. ............... 398/14 |
| 6,782,199 B1 | * | 8/2004 | Ye et al. ........................ 398/10 |
| 2002/0097460 A1 | | 7/2002 | Ikoma et al. |
| 2003/0138251 A1 | * | 7/2003 | Jayaram et al. ................ 398/38 |
| 2004/0004709 A1 | * | 1/2004 | Pitchforth, Jr. ............. 356/73.1 |
| 2004/0005151 A1 | * | 1/2004 | Pitchforth, Jr. ............... 398/37 |
| 2005/0021672 A1 | * | 1/2005 | Philyaw et al. ............. 709/217 |

FOREIGN PATENT DOCUMENTS

| EP | 1096705 | 5/2001 |
| WO | WO 98/16027 | 4/1998 |

* cited by examiner

Primary Examiner—Kinfe-Michael Negash

(57) ABSTRACT

An arrangement and a method for testing a telecommunications circuit over Dense Wavelength Division Multiplexing (DWDM). A transmitter, which is optically coupled to the circuit, transmits a test-drive signal on the circuit. Through a network, a performance of the circuit is monitored at points along the circuit based on the transmitted test-drive signal.

20 Claims, 2 Drawing Sheets

ARRANGEMENT AND METHOD FOR TESTING FIBER OPTIC TELECOMMUNICATIONS CIRCUITS OVER DENSE WAVELENGTH DIVISION MULTIPLEXING (DWDM)

RELATED CASES

This patent application is a continuation of U.S. patent application Ser. No. 09/758,496; filed on Jan. 11, 2001 now U.S. Pat. No. 6,778,778; entitled "Arrangement And Method For Testing Fiber Optic Telecommunications Circuits Over Dense Wavelength Division Multiplexing (DWDM); and hereby incorporated by reference into this patent application.

BACKGROUND OF THE INVENTION

The present invention generally relates to an arrangement and method for testing telecommunications circuits over Dense Wavelength Division Multiplexing (DWDM). Yet more particularly, the present invention relates to an arrangement and method that enable testing of cross country circuits over DWDM by a single person.

As is known, telecommunication service providers have created cross country or ultra-long haul networks. These networks are driven, in part, by the nature of internet and data traffic and by ever expansive enterprise networks. Voice traffic, on the other hand, is characterized as more regional and served principally by metropolitan and regional networks. Network planners visually depict these two developing traffic patterns as network overlays, served by different transmission equipment. Internet and data traffic over these networks has been increasing at a significant rate and currently dominates voice traffic for many long distance service providers.

Telecommunication service providers continually look toward new technologies leading to greater network carrying capacity, or bandwidth, and increasing transmission distances, which are the length separations between system transmitting and receiving terminals. DWDM is the favored optical technology for increasing bandwidth on an optical fiber. DWDM operates by multiplexing and transmitting a number of signals, i.e. OC-48 or OC-192, simultaneously at different wavelengths on the same optical fiber. As a result, a single optical fiber provides a number of virtual optical fibers by carrying a number of simultaneous signals. This permits greater network traffic through increased bandwidth.

The most aggressive service providers have deployed 40 channel DWDM systems with transmission distances limited to around 500 km before requiring Optical-Electrical-Optical (O-E-O) regeneration of the optical bit streams. Thus, DWDM systems are connected back-to-back for cross country connectivity. In order to overcome these limitations, DWDM system manufacturers are presently offering to at least double both channel count and transmission distance. More elaborate technologies will lead to greater length/bandwidth products and true ultra-long haul systems.

Along with the interests aimed at increasing both transmission length and bandwidth a greater importance is being placed on developing more efficient network management tools and test equipment. Service providers have been instrumental in driving this development and embedding performance measures and diagnostic tools into their system elements. Circuit tests that are performed by field operators include, for example, tests for optical power levels, loss of signal modulation, and code violations.

Currently, field technicians cannot trouble-shoot an entire cross country DWDM circuit without tremendous group coordination. Each cross country DWDM circuit comprises a number of sub-circuits that must be administered by a local field technician during a test. For example, a circuit from State 1, which is located in one region of a country, to State 4, which is located in a distant region of the country, might comprise multiple, sequential sub-circuits from State 1 to State 2, State 2 to State 3, and State 3 to State 4. During a test, a local field technician for a sub-circuit can only monitor and trouble-shoot their individual sub-circuit. Therefore, to obtain information relating to another sub-circuit, a field technician must either communicate with another field technician who is monitoring the other sub-circuit or rely on personnel in a Network Operation Center (NOC) that can survey the entire circuit.

Less reliance on the NOC is desired. It is impractical for a NOC to be heavily involved in turn-up testing or prolonged maintenance tasks. A NOC should rather be focused on in-service traffic management.

It is therefore desirable to empower field operations by providing the tools and test equipment needed for a network to efficiently manage turn-up and maintenance requirements.

SUMMARY OF THE INVENTION

It is therefore an object of the present invention to provide an arrangement and a method for testing that 1) reduces the cost of test equipment and 2) consumes less time and manpower than known arrangements and methods.

The present disclosure provides one or more embodiments directed to improvements in testing fiber optic telecommunications circuits over DWDM. These improvements can be provided in a single all-encompassing unit or practiced separately.

To this end, in one embodiment, there is provided a method for testing a circuit over Dense Wavelength Division Multiplexing (DWDM). A test-drive signal is transmitted on the circuit and a performance of the circuit is monitored at points along the circuit based on the transmitted test-drive signal.

In an embodiment, the field technician accesses downstream Network Elements (NE) over an Operations Support System (OSS) Network. The OSS Net is accessed via a LAN connection or via a dial-up connection and providing login information. For example, a field technician may Telnet to a downstream NE and provide the necessary login information to bring up that NE's management system or Craft Interface as if being on site and physically connected to the NE. Performance measures are visible at the Craft Interface display screen. As a result, the present invention enables testing of cross country circuits over DWDM by a single person.

In another embodiment, there is provided an arrangement for testing a telecommunications circuit over Dense Wavelength Division Multiplexing (DWDM). The arrangement comprises a transmitter for transmitting a test-drive signal on the circuit, which is optically coupled to a near end of the circuit. A network monitors performance of the circuit at points along the circuit based on the transmitted test-drive signal. As a result, the present invention provides an arrangement for testing an entire cross country circuit that requires only a single transmitter. A single field operator, who operates the transmitter, also monitors performance of any point on the circuit as described above. Other field operators can also monitor the circuit from their locations.

A DWDM circuit can comprise a number of sub-circuits, each sub-circuit having terminals at each end and possibly having at least one optical add-drop multiplexer and/or optical line amplifier. The performance of the circuit is monitored via the network at least one of a number of network elements along the circuit. Network elements comprise, for example, optical add-drop multiplexers and optical line amplifiers.

In another embodiment, there is provided a display, such as a laptop computer or Craft Interface Device (CID), which is connected to the network for displaying the monitored performance of the circuit. The display device can be connected to the wide area network via one of a local area network or dial-up connection.

In another embodiment, the transmitter is similarly controlled via the OSS Net or by direct physical connection using the same display device or CID or by a separate display device or CID.

The present invention is applicable to any transport framing structure with system support for "in-band" signaling and detection of key performance measures. For example, in an embodiment, SONET and SDH signals are transported over a DWDM system with performance monitoring at system client side ingress and egress points for optical power levels, loss of signal modulation, and code violations.

In the present discussion, IP or ATM circuits merely describe example cross country DWDM circuits; IP and ATM are traffic descriptors of the services transported within the payload area of a concatenated SONET or SDH signal. SONET and SDH provide various other channelized mixtures and payload mappings for transport of, for example, DS3, E1, or DS1 services.

These and other features of the invention will become clearer with reference to the following detailed description of the presently preferred embodiments and accompanying drawings.

DETAILED DESCRIPTION OF THE PRESENTLY PREFERRED EMBODIMENTS

As discussed above, there is provided an arrangement and a method for testing fiber optic telecommunications circuits over Dense Wavelength Division Multiplexing (DWDM) that, among other things, enable testing of cross country circuits over DWDM by a single person.

Figure 1:
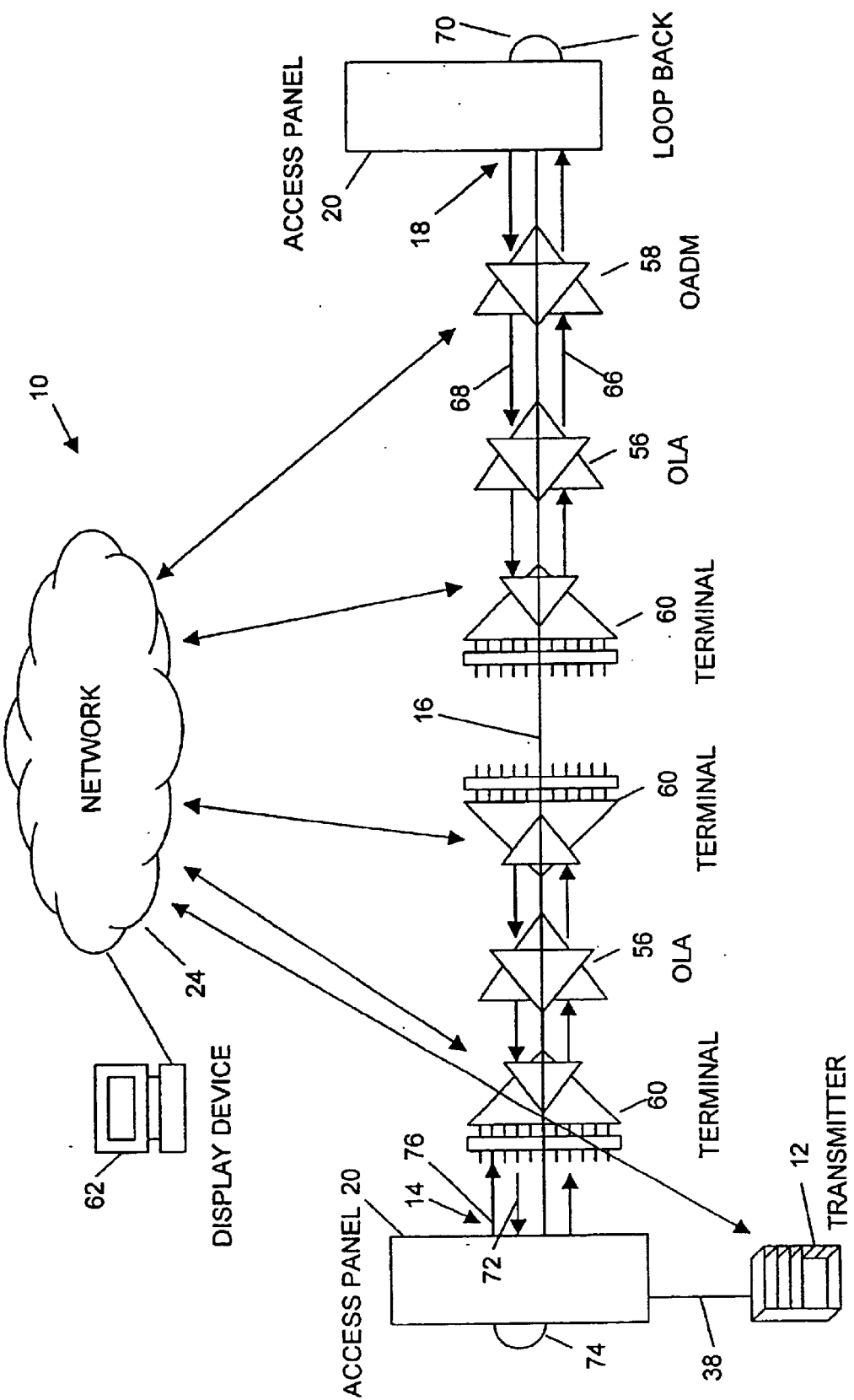
FIG. 1 is schematic block diagram of an arrangement for testing an IP or ATM circuit constructed and operated in accordance with the present invention.

In FIG. 1, there is illustrated an arrangement 10 for testing a circuit over DWDM that embodies principles of the present invention. As illustrated, a transmitter 12 is coupled to a near end 14 of a DWDM circuit 16 at a fiber access panel 20 using a fiber optic transmit cable or patch cord 38, as described below. The circuit 16 can comprise a single circuit between, for example, two closely located cities. Alternatively, the circuit 16 can comprise, for example, a multi-point cross country circuit between distant cities with a number of contiguous sub-circuits spanning intermediate cities.

The circuit 16 typically comprises a number of optical fibers, or channels, for transmission, including a number of critical spare channels. The channels terminate at the near end 14 and far end 18 of the circuit 16 at fiber access panels 20. The channels of any intermediate sub-circuits may also terminate at fiber access panels 20. In the present discussion, fiber access panels 20 cross-connect network elements, such as add-drop multiplexers, IP routers, or ATM switches, to individual channels on a DWDM system.

Currently, circuits are tested with a device that has both a transmitter for transmitting a test-drive signal on a circuit and a receiver for receiving the test-drive signal after it is returned from a far end of the circuit. Thus, there is a disadvantageously high cost associated with the current testing devices because they must incorporate both a transmitter and a receiver. The present arrangement 10 inventively overcomes this known disadvantage by providing a "bare bones" transmitter 12 to meet routine transmission demands. Thus, the cost of the present transmitter 12 is significantly lower than the cost of known transmitters because it does not require a receiver.

Figure 2:
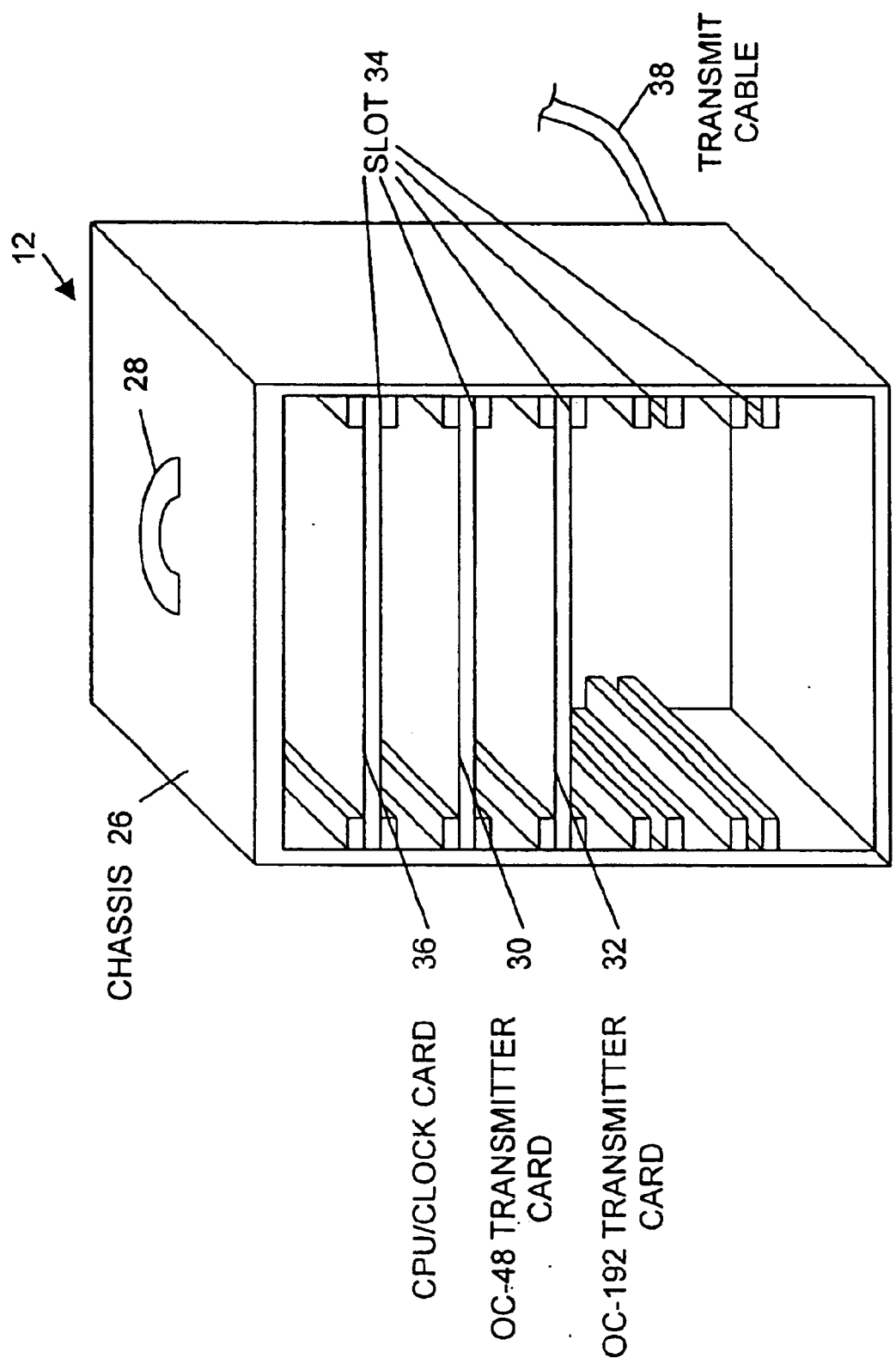
FIG. 2 is a plan view of a transmitter constructed and operated in accordance with the present invention.

Referring to FIG. 2, the transmitter 12 has a rack mounted chassis 26. The chassis 26 is portable and can be provided with a carrying handle 28 and/or mounted in a cross-connect cabinet or equipment rack.

One or more modular transmitter cards 30, 32 are mounted in slots 34 of the chassis 26. Each transmitter card 30, 32 produces a test-drive signal. In one embodiment, at least one of the transmitter cards 30 is an Optical Carrier-48 (OC-48), such as Synchronous Transport Signal-48c (STS-48c), transmitter. Additional transmitter cards can also be provided, such as an OC-192 (STS-192c) transmitter card 32 and/or a 40 Gigabit or higher transmitter card. Each transmitter card 30, 32 includes a laser transmit output port (not shown) for outputting the test drive signal. Timing and control of the transmitter cards 30, 32 is performed by a CPU/clock card 36, which is mounted in one of the slots 34. Additional slots 34 can be provided in the chassis 26 to accommodate additional cards, such as transmitter cards, receiver cards, or 4:1 passive splitter cards.

The transmitter cards 30, 32 are optically coupled to the fiber access panel 20 via a fiber optic transmit cable 38. The transmitter card 30, 32 optical interface to the transmit cable 38 complies with GR-253-CORE short reach specifications.

The transmitter 12 is designed to meet daily field requirements. A field technician controls the transmitter 12 via actuators (not shown) on the various transmitter cards 30, 32. A laser power actuator (not shown) toggles power to the laser (not shown) of the selected transmitter card 30, 32 and starts/stops the test-drive signal transmission. The transmitter cards 30, 32 also have an error insert actuator (not shown), which allows a field technician to inject a single error, such as a B1 byte error, into the test drive signal during BER testing.

Alternatively, a field technician can control the transmitter 12 by connecting a craft interface device either directly to the unit utilizing, for example, an RS-232 controlled connection or Ethernet port on the unit or over a LAN or Internet connection from afar, utilizing the Ethernet port on the unit. In an embodiment, where a field technician controls the transmitter 12 over an Internet connection, the unit's IP address is provided on a secure web site.

The test-drive signal need only conform to Short-Reach (SR) SONET specifications, amounting to a savings over Long Reach (LR) specifications, and preferably has a −3 dBm maximum output power at a wavelength of 1310 nm. Alternatively, the test drive signal can conform to other specifications. For example, the test drive signal can conform to LR SONET specifications or have a wavelength of, for example, 1280 nm to 1625 nm. In an embodiment, the test drive signal further comprises a test pattern of "1010 . . . ," for full bandwidth exercise, and a $2^{23}-1$ Pseudo Random Bit Sequence (PRBS) at OC-48 (STS-48c), which is a common stress pattern that simulates live traffic on the circuit 16. A $2^{31}$-1 PRBS is preferred at OC-192 (STS-192c). Test patterns may be selected by software control of the transmitter.

Preventive maintenance and trouble-shooting are ongoing activities for a field technician. They require testing of the entire circuit 16 to ensure that no problem areas exist. Thus, it is critical that a field technician has the ability to monitor the performance of the circuit 16 at all sub-circuit ingress and egress points. As stated above, testing of a cross country circuit currently involves the coordination of resources along the circuit. Each field operator can only monitor their individual sub-circuit. Therefore, to obtain information relating to another sub-circuit, a field operator must either communicate with another field operator who is monitoring the other sub-circuit or communicate with a NOC that can survey the entire circuit. During circuit testing, a variety of tests are routinely performed that include tests for optical power levels, loss of signal modulation, and code violations. Much of the time of circuit testing is spent, based on actual field experience, in performing continuity tests on turn-up testing before final Bit Error Ratio (BER) testing. This may be easily handled by keying in a number of B1 byte errors and confirming counters correctly incremented downstream; some technicians may use simple on/off laser control and look for Loss of Signal (LOS) and Loss of Frame (LOF) at downstream system ingress and egress points. Lacking continuity may require an installations technician to be dispatched to trouble-shoot and complete a cross-connect.

The present invention overcomes this known disadvantage by providing a network 24, such as an OSS network, for monitoring the performance of the entire circuit 16 and which can be viewed by any field technician who has access to the network 24. Thus, a single field technician can simultaneously control the test-drive signal transmitter 12 and monitor, through the network 24, the performance of the entire circuit 16.

The network 24 comprises a communications network operating under, for example, an Ethernet communications protocol. Circuit 16 performance data is gathered from NEs, such as Optical Add-Drop Multiplexers (OADMs) 58, Optical Line Amplifiers (OLAs) 56, and terminals 60 for monitoring on the network 24. An intermediate DWDM management system (not shown) can be provided to interface directly to the NEs 56, 58, 60 for embedded performance monitoring and to communicate the performance data to the network 24.

A field technician can monitor the performance of the circuit 16 simply by accessing the network 24 and telneting to the NE's IP address, made available on a secure web site. This access is preferably done through a display device 62, such as a laptop computer or CID, that is coupled to the network 24 via, for example, an Ethernet or dial-up connection.

Thus, the present invention eliminates the geographical constraints and manpower problems associated with current circuit testing methods and devices by providing an arrangement and method for monitoring performance of a circuit 16 from any location. A field technician can remotely access the network 24, telnet to a distant NE 56, 58, 60, and monitor the performance at any point on the cross country circuit 16. Further, the transmitter 12, which can be operated via a remote connection, can also be connected to the network 24 for remote control by the field technician. Therefore, a single field technician can both operate the transmitter 12 and monitor the entire circuit 16 from a display device 62 at a remote location.

It is preferable that field access to the DWDM management system via the network 24 be restricted to "read only" user privileges except for allowing B1 counters, or the like, to be reset to zero. Full access to the DWDM management system provides on/off control of all system vitals. Only the local field technician or NOC personnel have full administrative privileges. NE IP addresses should be posted on a secure web site.

During a test of the circuit 16, a field technician manually couples the transmitter 12 to the fiber access panel 20 if the transmitter 12 is not already coupled thereto. The field operator then activates the test-drive signal by pressing the laser power actuator (not shown). Accordingly, the test-drive signal, which preferably comprises the OC-48 or OC-192 signal with a desired default test pattern and a $2^{23}$-1 PRBS, is transmitted on the circuit 16. Other test patterns may be selected by software control of the transmitter settings.

Through the display device 62 connected to the network 24, the field technician will monitor data collected from the various network elements 56, 58, 60 along the circuit 16. Both a transmission path 66 and a return path 68 of the test-data signal can be monitored at one time by providing a loop-back 70 at the far end 18 of the circuit 12. In order to monitor a final section 72 of the return path 68 from the near end system egress point to the fiber access panel 20, an output channel of the return path 68 can be patched to an input of another channel, such as a spare channel 76, through the use of a coupling 74. The loop-back 70 can either be a hard loop-back or a soft loop-back. The performance of the entire circuit, i.e. BER measurement, can be monitored at the SPARE channel system ingress point.

Loop-backs and manual patching at fiber access panels may one day be supplanted by soft or facility loop-backs at 20. There is a demand for remote provisional x-connects or wavelength routers, as they may be referred to. System ingress and egress points may also feature a facility loop-back.

During BER testing, a field technician monitors the BER performance of the test drive signal at sub-circuit ingress and egress points 60 and 58. In order to simulate a B1 byte error, the field operator presses the error insert actuator (not shown) on the transmitter card 30, 32. This injects a single B1 byte error into the test-drive signal, which error can be monitored downstream at the network device 58 and 60. The field operator may zero a B1 byte counter through the display device 62. This is as an exception to the network 24 accounts being read-only accounts. Further, other types of errors can be injected into the test-drive signal.

The foregoing provides a cost effective apparatus and method for testing cross country circuits over DWDM by a single person.

Further, the present invention is applicable to any transport framing structure with system support for "in-band" signaling and detection of key performance measures. For example, in an embodiment, SONET and SDH signals are transported over a DWDM system with performance monitoring at system client side ingress and egress points for optical power levels, loss of signal modulation, and code violations. In the present discussion, IP or ATM circuits merely describe example cross country DWDM circuits; IP and ATM are traffic descriptors of the services transported within the payload area of a concatenated SONET or SDH signal. SONET and SDH provide various other channelized mixtures and payload mappings for transport of, for example, DS3, E1, or DS1 services As is apparent from the foregoing specification, the invention is susceptible to being embodied with various alterations and modifications which may differ particularly from those that have been described in the preceding specification and description. It should be understood that it is desired to embody within the scope of the patent warranted herein all such modifications as reasonably and properly come within the scope of the presently defined contribution to the art.

What is claimed is:

1. A system to test an optical communication path having a plurality of optical amplifiers:
    a communication network configured to communicate with each of the optical amplifiers;
    an optical transmitter configured to transmit an optical test signal over the optical communication path in response to a test instruction;
    a secure server configured to provide network addresses for the optical amplifiers; and
    a display device configured, in response to user commands, to retrieve the network addresses of the optical amplifiers from the secure server and to obtain test results from the optical amplifiers over the communication network using the network addresses.

2. The system of claim 1 wherein the optical communication path comprises a Wave Division Multiplex (WDM) communication path.

3. The system of claim 1 wherein the optical communication path comprises a Dense Wave Division Multiplex (DWDM) communication path.

4. The system of claim 1 wherein:
    the optical transmitter is coupled to the communication network; and
    the display device is configured, in response to another user command, to transfer the test instruction over the communication network to the optical transmitter.

5. The system of claim 1 wherein the network addresses comprise Internet Protocol (IP) addresses.

6. The system of claim 1 wherein the secure server comprises a web site.

7. The system of claim 1 further comprising a coupling that connects a terminating end of the optical communication path to an optical terminal that is not a test device, wherein the communication network is configured to communicate with the optical terminal, and wherein the display device is configured, in response to another user command, to obtain another test result from the optical terminal over the communication network.

8. The system of claim 1 wherein the optical communication path has a plurality of Add/Drop Multiplexers (ADMs) and wherein:
    the communication network is configured to communicate with each of the optical ADMs;
    the secure server is configured to provide network addresses for the optical ADMs; and
    the display device is configured, in response to other user commands, to retrieve the network addresses of the optical ADMs from the secure server and to obtain other test results from the optical ADMs over the communication network using the network addresses for the optical ADMs.

9. The system of claim 8 wherein the network addresses for the optical ADMs comprise Internet Protocol (IP) addresses.

10. The system of claim 8 wherein the secure server comprises a web site.

11. A method to test an optical communication path having a plurality of optical amplifiers:
    transmitting an optical test signal from an optical transmitter over the optical communication path in response to a test instruction;
    providing network addresses for the optical amplifiers in a secure server; and
    in a display device, in response to user commands, retrieving the network addresses of the optical amplifiers from the secure server and obtaining test results from the optical amplifiers over a communication network using the network addresses.

12. The method of claim 11 wherein the optical communication path comprises a Wave Division Multiplex (WDM) communication path.

13. The method of claim 11 wherein the optical communication path comprises a Dense Wave Division Multiplex (DWDM) communication path.

14. The method of claim 11 further comprising, in response to another user command, transferring the test instruction from the display device over the communication network to the optical transmitter.

15. The method of claim 11 wherein the network addresses comprise Internet Protocol (IP) addresses.

16. The method of claim 11 wherein the secure server comprises a web site.

17. The method of claim 11 further comprising:
    transferring the test signal from a terminating end of the optical communication path to an optical terminal that is not a test device; and
    in the display device, in response to another user command, obtaining another test result from the optical terminal over the communication network.

18. The method of claim 11 wherein the optical communication path has a plurality of Add/Drop Multiplexers (ADMs) and further comprising:
    providing network addresses for the optical ADMs in the secure server; and
    in the display device, in response to other user commands, retrieving the network addresses of the optical ADMs from the secure server and obtaining other test results from the optical ADMs over the communication network using the network addresses for the optical ADMs.

19. The method of claim 18 wherein the network addresses for the optical ADMs comprise Internet Protocol (IP) addresses.

20. The method of claim 18 wherein the secure server comprises a web site.

* * * * *